March 24, 1970    L. A. WOOLLEY    3,502,836
ELECTRICAL RIVET CONTACT
Original Filed Oct. 14, 1966
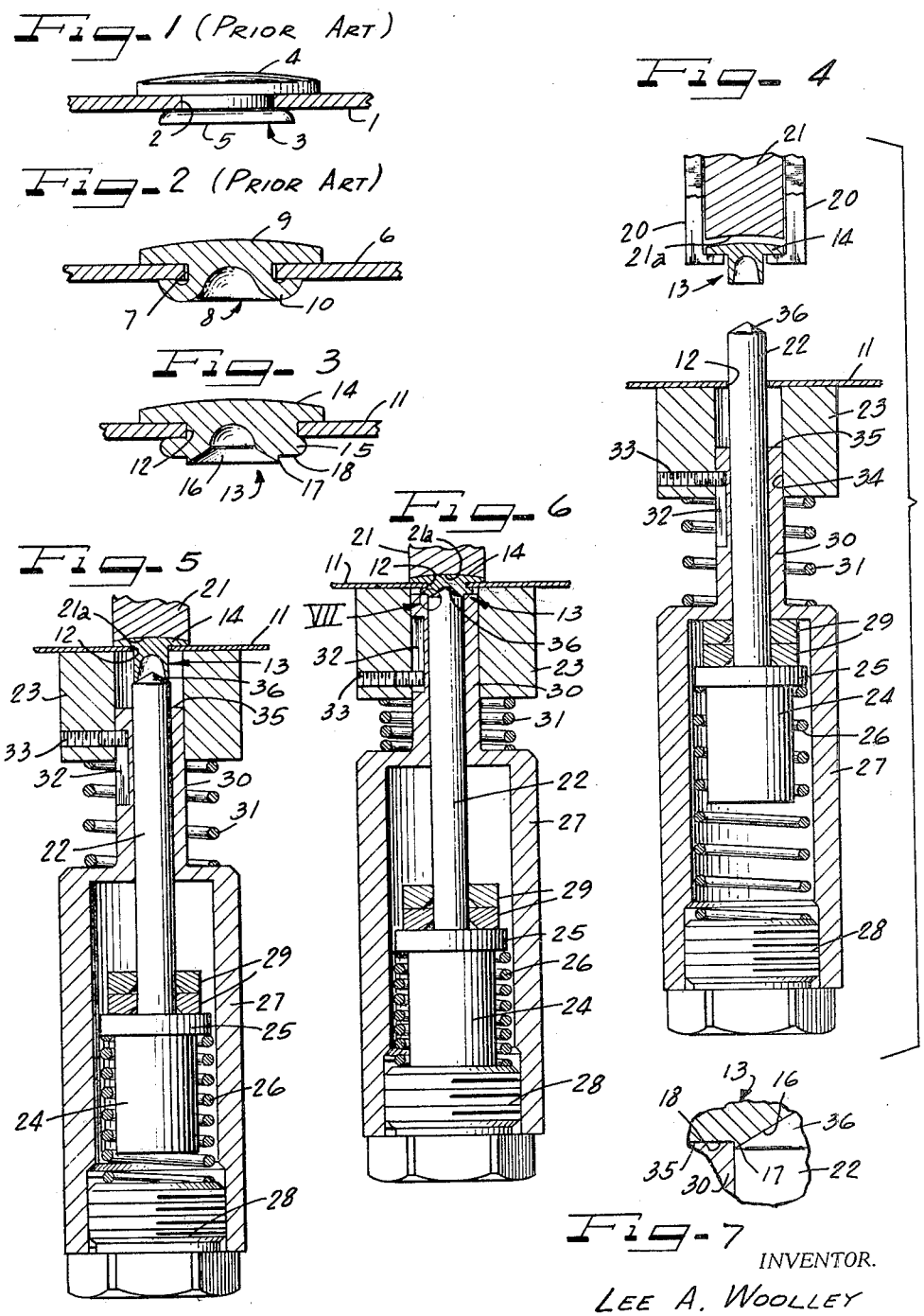
INVENTOR.
LEE A. WOOLLEY
BY *Hill, Sherman, Meroni, Gross & Simpson*    ATTORNEYS United States Patent Office 3,502,836
Patented Mar. 24, 1970

3,502,836
ELECTRICAL RIVET CONTACT
Lee A. Woolley, Kokomo, Ind., assignor, by mesne assignments, to The Scott & Fetzer Company, Lakewood, Ohio, a corporation of Ohio
Original application Oct. 14, 1966, Ser. No. 586,846, now Patent No. 3,432,925, dated Mar. 18, 1969. Divided and this application Oct. 11, 1968, Ser. No. 766,914
Int. Cl. H01h 1/06
U.S. Cl. 200—166                                      1 Claim

ABSTRACT OF THE DISCLOSURE

An electrical contact, formed as a tubular rivet, has its tubular end received in an anvil and supported therein so that on subsequent squashing, the central portion of the rivet shank is expanded to fill the aperture in the contact blade and surplus material is radially extruded between the element and the anvil, such radial cold flow being limited and restricted by such reception of the end of the rivet within a slightly larger opening in the anvil to form a shoulder that has a cylindrical surface slightly larger than the original shank diameter and having a length between .001 and .005 inch. Such length is established by arresting of a pilot rod that is movable into the anvil to provide a circular pocket between .001 and .005 deep at the anvil surface which receives the tubular shank.

This application is a division of my copending application, Ser. No. 586,846 filed Oct. 14, 1966, now entitled "Method of Securing a Rivet Contact in an Aperture of an Electrical Element," and now U.S. Patent No. 3,432,925.

This invention relates to the assembly of a rivet contact attached to an electrical element such as a blade.

In the past, tubular shank rivets, as contacts for electrical blades, have been preferred over solid shank rivets because of the use of lesser amounts of material and consequent lesser cost. Tubular shank rivets, however, have had certain disadvantages in being attached to the electrical element or blade due to such things as poorer electrical contact with the blade, buckling of the blade, rivet cracking, maintenance of the tools, etc. These disadvantages become particularly of moment when the rivet is composed of relatively hard metal such as silver cadmium oxide.

An object, therefore, is to provide an electrical element or blade with a shank type rivet contact so attached as to overcome the previous problems and disadvantages.

Further, an important object of the invention is to provide an electrical element or blade with a staked contact that results in improved electrical qualities in the article.

In accordance with the general features of this invention, there is provided an improved attachment of a tubular shank rivet to an electrical element wherein the electrical element has an aperture of a size to receive the shank of a rivet to be interlocked therewith, with the head of the rivet overlapping the edge of the aperture on one side of the electrical element, and wherein the end of the rivet shank portion is staked to the other side of the element, such staked portion being centrally recessed opposite the aperture and at least partially defined by a metal flow controlling shoulder slightly inset endwise toward the element and generally in axial alignment with the aperture and with the staked portion molded against the interior wall of the aperture into pressure contact therewith and flaring radially outwardly between the aperture and the shoulder in tight engagement with such other side of the element.

Still other features of the invention relate, in the apparatus for attaching the contact rivet to the blade, to an anvil for staking the end of the rivet shank to the element or blade arranged to be disposed closer to the element than the base of a pointed or conical end of a central pilot rod aligned with the blade aperture and bearing on the end of the shank of the rivet.

Other objects and features of this invention will more fully appear from the following detailed description taken in connection with the accompanying drawings which illustrate a single embodiment of the invention and wherein:

FIG. 1 is a fragmentary cross-sectional view, partly in elevation, of a prior art solid type rivet applied to a blade;

FIG. 2 is a fragmentary cross-sectional view of a prior art tubular shank type rivet staked to a blade and showing the loose fit in the aperture of the blade;

FIG. 3 is a fragmentary cross-sectional view illustrating a tubular rivet attached to an electrical element or blade in accordance with this invention;

FIG. 4 is a vertical cross-sectional view, partly in elevation, showing mechanism for staking the tubular rivet of FIG. 3 to an electrical element or blade;

FIG. 5 is a cross-sectional view similar to FIG. 4 showing the shank of the rivet inserted in the blade and in cooperation with an end of a pilot rod prior to the application of the anvil;

FIG. 6 is a vertical cross-sectional view similar to FIG. 5 showing the manner in which the anvil moves closer to the blade than the base of the conical end of the pilot rod for staking the rivet; and FIG. 7 is an enlarged fragmentary cross-sectional view of the encircled portion in FIG. 6.

As shown on the drawings:

In FIGS. 1 and 2, for purposes of comparison with my present invention, there are illustrated prior forms of rivet type contacts secured to electrical elements or blades.

The form shown in FIG. 1 involves an electrical element or metal blade 1 having an aperture or hole 2 through which projects the shank of a rivet 3 having a head or contact 4 overlying the edge of the aperture and having a staked portion 5 riveted to the other side of the element 1. With this solid type of contact shank, which is usually made of a silver alloy composition, more material is used in the rivet than for the rivet of FIG. 2, thus adding to the cost of the article. In all forms, the electrical blade 1, 6 or 11 may be made from any suitable springy metal material.

In the form of FIG. 2, a blade or element 6 has an aperture 7 through which the shank of a tubular rivet 8 extends. This rivet has a contact head 9 overlapping the edge of the aperture 7 on one side of the blade or element 6 and a staked or riveted portion 10 overlapping the other side. While this form is more economical to make, due to lesser material being present in a tubular shank rivet, it has certain disadvantages noted before. One of the principal disadvantages is the looseness of fit of the rivet shank in the aperture 7 resulting in poor electrical contact. This is occasioned by the rolling or flowing of the thin metal wall of the shank away from the aperture. Also, with this type of fastening there is a tendency for the blade to buckle at the aperture.

In FIG. 3, there is illustrated my new article of manufacture wherein a tubular rivet 13 is secured in place in accordance with this invention. Prior to staking, the rivet 13 is identical to the rivet 8. An electrical element or blade 11 has an aperture 12 through which the tubular shank of the rivet 13 extends with the contact or head 14 overlying the edge of the aperture on one side of the element 11. In this form, the flow of the metal in the cold working or staking operation is so controlled that the rivet shank tightly fits the aperture 12 so as to have good electrical contact therewith. The staked portion 15 has a central indentation 16 shaped in part by the pilot rod (to be described hereinafter) and is defined by a shoulder 17 surrounded by an anvil flattened portion 18 tightly pressed against the margin of the blade around the aperture 12. The forming of the shoulder 17, as shall become apparent hereinafter, controls the flow of the metal so that there is less tendency for it to roll away while out of contact with the inner wall of blade aperture 12.

An apparatus for staking the tubular shank rivet 13 in position as shown in FIG. 3 is illustrated in FIGS. 4–7.

As shown in FIG. 4, the tubular shank rivet 13 has its head 14 engaged and held in position for the subsequent operations by spaced conventional fingers or jaws 20—20. A cylindrical ram 21 having a concave end 21a conformed to the curved top or shape of the rivet head 14, is movable downwardly into engagement with the rivet head 14 to drive the rivet 13 toward the upper end of a pilot rod 22 which extends upwardly through the aperture 12 in the electrical element or blade 11 carried on an annular supporting member or ring 23.

The other and lower end 24 of the cylindrical pilot rod 22 is enlarged and has an annular shoulder 25 engaged by the upper end of an expansion spring 26 inside of a fixed cylindrical housing 27, the lower end of which is closed by a threaded nut or plug 28. The housing 27 is fixedly and firmly supported in any suitable manner. Also, the lower end of the spring 26 contacts the inner end of the nut 28 and the force of the spring 26 may be varied by varying the position of the threaded nut 28.

Disposed above the pilot rod shoulder 25 are a pair of stop washers 29 of any suitable construction for abutting the upper end of the housing 27. The springs 26 and 31 are calibrated or selected in accordance with the spring resiliency desired.

Projecting upwardly and integral with the housing 27 is a tubular extension 30 which extends into the blade supporting member or ring 23 and has surrounding it an expansion spring 31 disposed between the housing 27 and the underside of the ring 23. The tubular extension 30 has a key-way slot 32 in which is received an end of a pin 33 threaded transversely through a lower portion of the supporting ring 23. The pin 33 holds the parts together, but permits a limited amount of longitudinal travel of the supporting ring 23 downwardly about the pilot rod 22 as shown in FIGS. 5 and 6.

The upper end of the tubular extension 30 inside of the blade supporting ring 23 has a flat annular anvil surface 35. The upper end of the pilot rod 22 has a predetermined conical point 36, the location of which is important as shall be described more in detail in connection with FIGS. 6 and 7.

The ram 21 moves the jaw-supported rivet 13 downwardly against the conical point 36 on the pilot rod 22, and after the shank of the rivet 13 enters the aperture 12 in the blade 11, the jaws or fingers 20—20 are automatically removed in any suitable known manner. Continued downward movement of the ram 21 brings the head 14 of the rivet 13 into contact with the top surface of the blade or element 11 (FIG. 5). During this movement, the pilot rod 22 is pushed downwardly inside of the housing 27 compressing the spring 26 until the lower end 24 of the pilot rod 22 is arrested by the nut 28. Thereafter, continued downward movement of the ram 21 lowers the supporting ring 23 and compresses the spring 31 permitting the anvil end 35 of the extension 30 to move, relatively speaking, upwardly inside of the blade supporting ring 23.

The important and novel feature of this apparatus relates to the relative locations of the base of the conical point of the pilot 36 and the anvil surface 35 upon the arresting of the pilot 22 just before the conclusion of the ram stroke. As best shown in FIG. 7, the base of the pilot point is lower down or is located further away from the underside of the blade 11 than the flat anvil surface 35 so that end of the tubular rivet enters the annular anvil whereby the anvil restricts flow of the rivet material. Thus upon squashing, the flow of the material of the tubular shank is arrested and hence a shoulder is formed at 17. This prevents any tendency of the rivet shank to roll over as in standard tubular riveting.

As the ram moves further down, the tubular end of the rivet shank is caused to flow outwardly radially, and upon reaching the flat anvil surface 35, the tubular material is arrested and is provided with the flow controlling shoulder 17 (FIGS. 6 and 7) which places a drag on radial flow and hence concentrates the material in the locale of the blade aperture 12 so as to partially prevent the rivet material from flowing or rolling out of contact with the edge of the aperture. As the stroke of the ram or driver 21 continues, the shank is further compressed axially and expanded radially and hence tightly filling the aperture 12 in the blade 11 as the anvil engaged portion 18 is upset toward the blade. The conical point 36 shapes the center of the staked portion at 16 and the flat anvil 35 provides a gap into which the radially outwardly flowing and extending portion 18 can flow into overlapping relation with the underside of the edge of the blade aperture 12. Thus, the material of the tubular shank is molded to conform tightly to the interior surface of the wall defining the blade aperture 12 thus having a pressure contact therewith.

Advantageous results of this new contact construction and apparatus are briefly as follows:

(1) A solid-rivet-shank type of engagement is made with the internal wall of the aperture in the blade, while retaining the economy of a tubular rivet.

(2) Buckling of the blade at the aperture is substantially eliminated.

(3) Tighter or pressure contact is enabled between the blade and the staked portion of the rivet shank, thereby decreasing the internal electrical resistance and hence increasing the electrical rating of the assembly.

(4) The elimination of the roll-over minimizes cracking of the staked portion.

(5) Greater life of the tools used, and particularly of the anvil, is made possible.

(6) Reconditioning of the anvil is much easier than is the case where a complex shape is employed in the roll type anvil and the pilot of previous structures.

With reference again to FIG. 7, it has been found that the distance separating the anvil surface 35 and the base of the conical point 36 can be of the order of .001 to .005 inch, although usually several thousandths is adequate.

It has been determined that with this improved attachment of the tubular rivet to the blade, where an alloy such as silver cadmium oxide is used in the rivet, the electrical resistance between the electrical contact and the blade is so reduced that the ensuing structure can pass electrical tests for rating the same at as much as one-half horsepower as distinguished from around one-third horse-power in the past. Further, not only are the electrical qualities improved, but it is possible to save as much as 11% in material cost over previous solid-shank constructions. This saving does not take into consideration losses heretofore encountered due to rejects from radical cracking and cupping or buckling of the blade. Needless to say, where the blade buckles, the electrical effectiveness or rating of the contact is quite likely to be diminished.

Although minor modifications might be suggested by those versed in the art, it should be understood that I wish to embody within the scope of the patent warranted thereon, all such embodiments as reasonably and properly come within the scope of my contribution to the art.

I claim as my invention:

1. As an article of manufacture, an electrical element having an aperture with a tubular shank rivet therein interlocked with the element including a contact head overlapping the edge of the aperture on one side of the electrical element and a staked shank portion of the rivet on the other side of the element, and said staked portion being centrally recessed opposite the aperture and at least partially defined by a circular metal flow-controlling shoulder projecting axially away from the element and generally concentric with the aperture, the staked portion of the rivet being molded against the interior wall of the aperture into pressure contact therewith and flaring outwardly between said aperture and said shoulder in tight engagement with said other side of said element, said flaring portion having an indented anvil-flattened surface axially closer to said blade than an axially outer edge of said shoulder.

References Cited

UNITED STATES PATENTS 2,890,315  6/1959  Graves.
3,200,226  8/1965  Cooley.

HERMAN O. JONES, Primary Examiner